United States Patent [19]

Walker, Jr. et al.

[11] Patent Number: 4,784,876

[45] Date of Patent: Nov. 15, 1988

[54] SYMPATHETIC INK AND DEVELOPER SYSTEM

[75] Inventors: Haywood A. Walker, Jr.; Marvin P. Dixon, both of Liberty, Mo.

[73] Assignee: Lynwood Graphics, Inc., Liberty, Mo.

[21] Appl. No.: 142,276

[22] Filed: Dec. 31, 1987

Related U.S. Application Data

[63] Continuation of Ser. No. 948,149, Dec. 31, 1986, abandoned.

[51] Int. Cl.[4] ........................ B41M 3/12; B41M 5/00; C09D 11/10

[52] U.S. Cl. ........................................ 427/150; 106/21

[58] Field of Search ............................ 106/21; 427/150

[56] References Cited

U.S. PATENT DOCUMENTS

| | | | |
|---|---|---|---|
| 3,349,408 | 10/1967 | Gillen et al. | 346/112 |
| 3,363,338 | 1/1968 | Skinner et al. | 35/36 |
| 3,451,143 | 6/1969 | Thomas et al. | 101/463 X |
| 3,505,366 | 4/1970 | Greco et al. | 260/399 |
| 3,640,750 | 2/1972 | Schutzner | 427/145 |
| 3,788,863 | 1/1974 | Scheuer | 106/21 |
| 3,823,022 | 7/1974 | Thomas | 101/426 X |
| 4,051,283 | 9/1977 | Thomas et al. | 428/29 |
| 4,303,719 | 12/1981 | Vassiliades | 428/207 |
| 4,455,262 | 6/1984 | Detienne et al. | 260/502.6 |
| 4,461,496 | 7/1984 | Ludwig | 346/210 |

FOREIGN PATENT DOCUMENTS 415535 5/1933 United Kingdom .

OTHER PUBLICATIONS

Chemical Abstract, vol. 104, No. 16, Abstract No. 141436z, Zinchuk et al., U.S.S.R., Patent No. 1176244, Aug. 30, 1985.

"Titas Simpaticas" by P. L. DeAraujo Feio, Revista Da Sociedade Brasileira de Quimica, Boletin Cientifico, vol. XIV, Janeiro-Marco de 1945, N. 1, Rio de Janeiro, Brazil.

*Primary Examiner*—Michael Lusignan

*Attorney, Agent, or Firm*—Hovey, Williams, Timmons & Collins

[57] ABSTRACT

A sharp imaging, non-smearing system for latent imaging and subsequent visual development of printed text or the like is provided which can be used on a variety of substrates (e.g. paper, metal, cloth, synthetic resins) and is extremely stable and easy to use. The system involves first imaging a substrate with an invisible non-blurring, non-sublimating ink containing a dissociable nickel salt such as $NiSO_4$, with subsequent application of a liquid developer containing a dispersed color precursor such as dimethylglyoxime which reacts with nickel ion to give a sharp, long lasting red color. The developer preferably includes an accelerator such as NaOH for accelerating the above reaction so as to make it virtually instantaneous. The system of the present invention can be used in a variety of contexts, such as in self-testing materials or novelty items.

3 Claims, No Drawings

SYMPATHETIC INK AND DEVELOPER SYSTEM

This application is a continuation of application Ser. No. 948,149, filed 12/31/86, now abandoned.

BACKGROUND OF THE INVENTION

1. Field of the Invention

The present invention is concerned with an improved system for latent or invisible imaging of printed material onto a variety of substrates, with subsequent development of the latent image by application of a corresponding developing fluid. More particularly, it is concerned with such a latent imaging system, and a developer forming a part thereof, which makes use of a nickel salt in a non-blurring, non-sublimating, stable, invisible imaging ink, and a color precursor in the developer fluid which includes a dioxime compound capable of complexing with nickel cation to give a sharp, long lasting, non-smearing color. The developer advantageously includes a hydroxide accelerator for accelerating the reaction between the dioxime compound and the nickel ion.

2. Description of the Prior Art

Modern day sympathetic ink systems of commercial importance are designed for a variety of uses, for example in self-testing educational booklets. In such uses, a student may be provided with a multiple choice answer sheet, with the correct answer being indicated by appropriate latent image indicia. In selecting an answer, the student marks one of the multiple choice possibilities with developer substance; if his selection is correct, the latent indicia will reveal the student's correct choice and hence his progress. Other uses include certification testing, personnel selection and screening tests, novelty items such as games and toys, children's books designed for educational and/or entertainment purposes, securing of documents, prize verification and promotional items.

Systems of the type described typically involve application of a latent image by means of a normally invisible printing ink. Thereafter, the developer substance is applied over the invisible image and a color-forming chemical reaction occurs to "develop" the image and render the same visible. For example, U.S. Pat. No. 3,632,364 describes a latent imaging system wherein the invisible ink includes a soluble copper salt such as copper sulfate, while the developer includes a soluble iodide. In practice, the invisible ink is printed onto conventional paper, and is invisible to the naked eye. When the developer is applied, the iodide is oxidized by the copper ion present in the printed image to release iodine. The iodine in turn reacts with the starch in the paper to form a color. Other patents describing various latent imaging systems include U.S. Pat. Nos. 3,823,022, 4,051,283, 3,788,863, 3,451,143, 3,363,338, 3,349,408 and 4,631,203. Other references include British Pat. No. 415,535 and an article entitled "Tintas Simpaticas" by P. L. De Araujo Feio, *Revista da Sociedade Brasileira de Quimica,* Boletin Cientifico, Vol. XIV, Janeiro Marco de 1945, N. 1, Rio de Janeiro, Brazil. While certain latent imaging systems of the type described have commercial application in, e.g., education self-testing materials and the like, they are typically plagued by a number deficiencies. For example, the copper sulfate/soluble iodide system tends to develop an unstable color which will disappear under prolonged heating or ultraviolet light conditions. Moreover, in many instances the visual image lacks sharpness and clarity, and the color can smear if repeated applications of the developing fluid are made. Furthermore, use of this type of system is in practice generally limited to paper substrates, because of the necessity of having starch present as a part of the overall reaction. Thus, such a system is much more difficult to employ in the case of non-paper substrates such as metal or synthetic resin bodies.

The aforementioned article entitled "Tintas Simpaticas" also teaches the use of "dimetilglioxima a 1%" as the "elemento principal da T. S." in conjunction with "sulfato de niquel" as the "revelador" thereby yielding "rosa" as the "coloracao que toma a T. S. ao ser revelada." It is therefore believed that the article suggests the use of dimethylglyoxime at 1% as a latent imaging ink to be applied to an appropriate substrate and nickel sulfate as the developer ultimately applied over the dimethylglyoxime ink to yield a red colored print. This disclosed method of latent imaging has several serious problems associated with it. For example, when dimethylglyoxime is used as an ink applied to a paper substrate it tends to sublimate, thereby transferring ink between adjacent pages. In the case of self-testing booklets for example this can be a problem because imprinted material can be transferred page-to-page making the booklet very confusing to the user. Moreover, dimethylglyoxime also tends to migrate within a paper page and thereby blur the printed images. This in turn makes it difficult to employ fine printing with such inks. As a consequence of these problems there are no known instances of commercial use of a dimethylglyoxime ink/nickel sulfate developer latent imaging system.

SUMMARY OF THE INVENTION

The present invention overcomes the problems noted above and provides a greatly improved method of imaging a substrate with a concealed image, followed by subsequent development of the image to render the same visible. The system of the present invention uses a non-blurring, non-sublimating nickel salt imaging ink which provides an extremely stable and long lasting sharp color image upon development, and moreover can be used with virtually any type of substrate. Furthermore, the preferred developer of the present invention includes a dioxime color precursor and an accelerator for accelerating the color reaction between the developer and the ink.

Broadly speaking, the method of the present invention involves imaging a substrate with a printing material having therein a nickel salt, with the printing material being characterized by the property of being invisible to the naked eye when applied to the substrate, and preferably remaining invisible to the naked eye on the substrate under normal ambient conditions for a period of at least about one year (more preferably two years or more). Visual development of the concealed image is accomplished by applying thereto a liquid developer substance. The developer comprises a compound selected from the group consisting of dioxime compounds of the formula

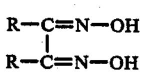

wherein each R is respectively taken from the group consisting of alkyl groups and aryl groups. Preferably each R substituent is separately selected from the group consisting of alkyl groups having from 1 to 10 carbon atoms, and substituted and unsubstituted aromatic rings. Advantageously, the alkyl group has from 1 to 4 carbon atoms, with methyl being the most preferred alkyl substituent, while the most preferred aryl substituent is phenol. The color precursor compound as above defined is dispersed, either as a neutral compound or preferably as a salt form such as the sodium, potassium or ammonium salts, in a liquid carrier. The carrier serves to dissociate the nickel salt of the printing material into dissociated nickel cation and anion, and also maintains the color precursor compound in a dispersed state in the presence of the dissociated salt. This permits a color reaction to take place between the dissociated nickel cation and the color precursor compound. Specifically, these components react to form an insoluble, highly stable dye compound on the substrate.

A wide variety of nickel salts, such as nickel sulfate and nickel acetate, can be used to good effect in the invention. The nickel salts forming a part of the imaging or printing material are typically suspended in a carrier. Particularly good results have been obtained with a carrier comprising a major proportion of glycerin, together with a minor amount of commercially available surfactant. The nickel salt forms a relatively small portion of the overall printing material, i.e., usually the printing material contains only up to about 11% by weight of nickel salt. Imaging or printing materials using nickel salts once dried neither appreciably sublimate nor blur over time, thereby avoiding problems associated with the transference of images from one page to a facing page. Furthermore, the nonblurring nickel salt imaging or printing materials hereof permit the use of fine print and avoid the legibility problems associated with use of dimethylglyoxime as an ink.

As indicated previously, a virtually unlimited number of substrates can be used in the context of the invention, so long as the printing material can be applied thereto and no adverse reactions occur between the nickel salt of the printing material and the substrate. Thus substrates selected from the group consisting of paper, metals, wood, cloth and synthetic resins can normally be used in the invention.

The developer of the present invention broadly includes a color precursor compound of the type defined above, together with a carrier. Most preferably, the carrier includes water, together with an organic solvent or surfactant for solubilizing the color precursor. Water is advantageously present in the carrier at a level of from about 50 to 90% by weight. In preferred forms of the invention use can be made of a variety of organic solvents such as alcohols having 1 to 10 carbon atoms (e.g., methyl alcohol or ethyl alcohol); the only real requirement is that the solvent be capable of maintaining the color precursor compound in a properly dispersed state, so as to permit the reaction thereof with nickel cation. When use is made of such an alcoholic solvent, the carrier should contain from 10 to 50% by weight alcohol, whereas the complete developer should typically contain from about 7 to 50% by weight alcohol.

The color precursor compounds of the invention can broadly be classed as compounds having the following structural formula

R—C=N—OH
|
R—C=N—OH wherein each R respectively is selected from the group consisting of alkyl groups and aryl groups. In the case of aryl-substituted compounds, compounds of the formula

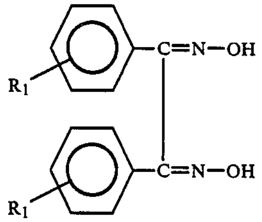

wherein each $R_1$ is a polar or nonpolar substituent, are preferred. The single most preferred color precursor compound is dimethylglyoxime having the structural formula of $CH_3$—C=N—OH
|
$CH_3$—C=N—OH In normal practice, the dioxime should be present at a level of up to about 5% by weight, and preferably from about 1 to 5% by weight in the final developer. Preferably, a hydroxide such as sodium hydroxide should also be present at a level of up to about 5% by weight, and preferably in the range of about 1 to 5% by weight in the final developer.

DESCRIPTION OF THE PREFERRED EMBODIMENT

The most preferred latent imaging printing material, for purposes of printing onto paper substrates, has 10 to 11% by weight of nickel sulfate salt dispersed in a carrier comprising glycerin having dissolved therein 0.06 gram per liter of sodium diethylsulfosuccinate surfactant. Use may be made of lithographic, letter press, letterset, flexographic, silk screen and rotogravure equipment in the context of the invention. The starting materials are simply mixed together to form a desirable flowable printing material. This formula provides a printing material having sufficient solubility or dispersibility of the nickel salt, and appropriate viscosity characteristics for use in high speed sheet or web fed printing press equipment. Moreover the material leaves no substantial residue on the imprinted substrate and the carrier component slowly evaporates over time. Finally, the printing material is entirely invisible to the naked eye and is extremely stable over very long periods of time.

While the foregoing composition is most preferred, those skilled in the art will recognize that numerous variations in the nickel salt employed, as well as in the carrier, can be made. This is particularly the case when it is desired to imprint on different substrates such as solid, metallic or synthetic resin objects. In such instances routine experimentation may be required to optimize the printing material.

One developer substance comprises a mixture of water and methyl alcohol as a carrier, together with the dimethylglyoxime color precursor compound and sodium hydroxide accelerator added to the carrier. Specifically, a mixture of 90% by volume water and 10% by volume of methyl alcohol is employed as a carrier for the color precursor of the developer. After the carrier is prepared, 2.5 grams of dimethylglyoxime is added per 100 milliliters of carrier, followed by mixing. Then, 1.72 grams of sodium hydroxide is added per 100 milliliters of carrier, followed by mixing. Thus, it is preferred to provide equimolar amount of the dimethylglyoxime and sodium hydroxide in the developer. When nickel sulfate is employed in the printing material, the resultant color using the described developer is red. The color precursor and the nickel cation react to form insoluble complexes.

If desired, the developer may be supplied with a dye or pigment apart from the precursor, such may be useful for visibly marking the region of the substrate to which the developer has been applied, even if that region did not contain any latent image.

As indicated above, the present invention can be used in a variety of contexts, such as in the printing industry and in novelty items. In the latter case, a novelty pen set can be prepared with a first imaging pen containing a printing material in accordance with the invention, and a second developer pen containing the developer fluid. In use, a substrate is imaged with the first pen, and later developed with the second pen.

Those skilled in the art will readily appreciate that while certain specific printing material and developer formulations have been described, numerous variations can be made without departing from the spirit and scope of the present invention. It is, of course, intended to cover all such appropriate alternatives and variations.

We claim:

1. A method of imaging a substrate with a concealed textual image, and subsequently developing the concealed textual image to render the same visable and readable, said method comprising the steps of:

imaging said substrate by imprinting thereon readable, textual characters, said imaging comprising imprinting said textual characters with a printing material including a carrier with a nickel salt dispersed therein, said carrier comprising a major portion of glycerin, said material being characterized by the property of being invisible to the naked eye when applied to said substrate;

thereafter visually developing said invisible textual characters by applying thereto a liquid developer substance, said substance comprising from about 50 to 90% by weight water, from about 1 to 5% by weight dimethylglyoxime, and a quantity of a base, said dimethylglyoxime being dispersed within the developer substance for permitting a color reaction to take place between the nickel cation of said nickel salt and the dimethylglyoxime.

2. The method of claim 1, said nickel salt being selected from the group consisting of nickel sulfate and nickel acetate.

3. The method of claim 1, said liquid developer including an alcohol.

* * * * *